US011112532B2

(12) United States Patent
Jägenstedt et al.

(10) Patent No.: US 11,112,532 B2
(45) Date of Patent: Sep. 7, 2021

(54) WEATHER COLLECTION AND AGGREGATION VIA ROBOTIC VEHICLE

(71) Applicant: HUSQVARNA AB, Huskvarna (SE)

(72) Inventors: Patrik Jägenstedt, Tenhult (SE); Tom Soberg, Blidsberg (SE); Magnus Öhrlund, Malmbäck (SE); Andreas Källming, Tranås (SE); Fredrik Kallström, Huskvarna (SE); Jonas Holgersson, Huskvarna (SE); Mattias Kamfors, Jönköping (SE); Stefan Grufman, Bankeryd (SE)

(73) Assignee: HUSQVARNA AB, Huskvarna (SE)

(*) Notice: Subject to any disclaimer, the term of this patent is extended or adjusted under 35 U.S.C. 154(b) by 435 days.

(21) Appl. No.: 15/540,145

(22) PCT Filed: Dec. 22, 2015

(86) PCT No.: PCT/IB2015/059897
§ 371 (c)(1),
(2) Date: Jun. 27, 2017

(87) PCT Pub. No.: WO2016/103189
PCT Pub. Date: Jun. 30, 2016

(65) Prior Publication Data
US 2018/0038993 A1 Feb. 8, 2018

Related U.S. Application Data

(60) Provisional application No. 62/097,048, filed on Dec. 27, 2014.

(51) Int. Cl.
G01S 19/47 (2010.01)
G01W 1/02 (2006.01)
(Continued)

(52) U.S. Cl.
CPC ............... *G01W 1/02* (2013.01); *G01S 19/47* (2013.01); *G06F 16/285* (2019.01);
(Continued)

(58) Field of Classification Search
CPC ....... A01D 34/008; G01S 19/47; G01W 1/02; H04W 84/18
(Continued)

(56) References Cited

U.S. PATENT DOCUMENTS 3,596,264 A * 7/1971 Ciemochowski ....... G01W 1/14
340/870.16
5,333,969 A * 8/1994 Blaha ...................... E01C 19/46
404/102
(Continued)

FOREIGN PATENT DOCUMENTS

JP 2000342497 A * 12/2000

OTHER PUBLICATIONS

International Search Report and Written Opinion for International Application No. PCT/IB2015/059897 dated Apr. 8, 2016.
(Continued)

Primary Examiner — Jeffrey P Aiello
(74) Attorney, Agent, or Firm — Burr & Forman, LLP

(57) ABSTRACT

A robotic vehicle may be configured to incorporate multiple sensors to make the robotic vehicle capable of collecting, feeding, and uploading weather data into an aggregation agent to form a geospatial map or weather service. In this regard, in some cases, the robotic vehicle may include an onboard vehicle positioning module and sensor network to give the robotic vehicle a collective understanding of its environment, and enable it to autonomously collect and upload weather data to an aggregation agent for corresponding locations.

17 Claims, 10 Drawing Sheets

(51) Int. Cl.
  *G06F 17/00* (2019.01)
  *G06F 16/28* (2019.01)
  *G06F 16/9537* (2019.01)
  *A01D 34/00* (2006.01)
  *H04W 84/18* (2009.01)
(52) U.S. Cl.
  CPC ........ *G06F 16/9537* (2019.01); *A01D 34/008* (2013.01); *H04W 84/18* (2013.01)
(58) Field of Classification Search
  USPC .................. 340/540; 702/1, 150, 188, 19
  See application file for complete search history.

(56) References Cited

U.S. PATENT DOCUMENTS

| | | | | |
|---|---|---|---|---|
| 9,944,282 | B1* | 4/2018 | Fields | G07C 5/0808 |
| 2005/0203681 | A1* | 9/2005 | Minor, Jr. | H04W 4/70 |
| | | | | 701/23 |
| 2009/0234499 | A1* | 9/2009 | Nielsen | B25J 9/161 |
| | | | | 700/250 |
| 2009/0273470 | A1* | 11/2009 | Sinkevicius | G08B 25/10 |
| | | | | 340/539.26 |
| 2010/0332131 | A1* | 12/2010 | Horvitz | G01C 21/3484 |
| | | | | 701/414 |
| 2011/0054689 | A1* | 3/2011 | Nielsen | G05D 1/0088 |
| | | | | 700/258 |
| 2015/0101519 | A1* | 4/2015 | Blackwell | B60P 3/00 |
| | | | | 111/200 |
| 2015/0124242 | A1* | 5/2015 | Pierce | G01S 17/89 |
| | | | | 356/5.01 |
| 2016/0127931 | A1* | 5/2016 | Baxley | G06F 16/285 |
| | | | | 455/67.16 |
| 2016/0165795 | A1* | 6/2016 | Balutis | G05D 1/0088 |
| | | | | 701/25 |
| 2018/0038993 | A1* | 2/2018 | Jagenstedt | G01W 1/02 |

OTHER PUBLICATIONS

International Preliminary Report on Patentability for International Application No. PCT/IB2015/059897 dated Jun. 27, 2017.
John P. Grotzinger et al.,"Mars Science Laboratory Mission and Science Investigation", Space Science Reviews, Kluwer Academic Publishers, DO, vol. 170, Issue No. 1-4, pp. 5-56, Jul. 25, 2012.

* cited by examiner

WEATHER COLLECTION AND AGGREGATION VIA ROBOTIC VEHICLE

CROSS REFERENCE TO RELATED APPLICATIONS

The present application claims priority to U.S. patent application No. 62/097,048 filed Dec. 27, 2014, which is expressly incorporated by reference in its entirety.

TECHNICAL FIELD

Example embodiments generally relate to robotic vehicles and, more particularly, relate to a robotic vehicle that is configurable to collect, feed, and aggregate weather data into a geospatial map or weather service.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

As technological capabilities have improved, various devices or sensors have been developed that are capable of employment to monitor various aspects of working conditions. However, even with the improvement of monitoring devices or sensors, robotic vehicles (e.g., robotic mowers) have been unable to collect weather data and aggregate that data into geospatial maps or weather services via the cloud. Thus, it may be desirable to expand the capabilities of robotic vehicles to improve their utility and functionality.

BRIEF SUMMARY OF SOME EXAMPLES

Some example embodiments may therefore provide a robotic vehicle that is configured to incorporate multiple sensors to make the robotic vehicle capable of collecting, feeding, and aggregating weather data into a geospatial map or weather service. In this regard, in some cases, the robotic vehicle may include an onboard vehicle positioning module and sensor network that may work together to give the robotic vehicle a collective understanding of its environment, and enable it to autonomously collect and aggregate weather data for corresponding locations.

In an example embodiment, a method of providing data for aggregation may include receiving information indicative of weather data responsive to communication received from a sensor network of a robotic vehicle while the robotic vehicle transits a parcel. The method may further include receiving information indicative of position data of the robotic vehicle at a time corresponding to communication from the sensor network, and uploading the weather data and the corresponding position data to an aggregation agent.

In another example embodiment, a method of aggregating weather data is provided. The method may include receiving information indicative of weather data responsive to communication received from a sensor network of each of a plurality of robotic vehicles while each of the plurality of robotic vehicles transits a parcel. The method may further include receiving information indicative of position data of each of the plurality of robotic vehicles at a time corresponding to communication from the sensor network, and aggregating weather data and corresponding position data from the plurality of robotic vehicles into at least one of a geospatial map or weather service.

In another example embodiment, a robotic vehicle is provided. The robotic vehicle may be configured to incorporate multiple sensors to make the robotic vehicle capable of collecting, feeding, and uploading weather data into an aggregation agent to form a geospatial map or weather service. In this regard, in some cases, the robotic vehicle may include an onboard vehicle positioning module and sensor network to give the robotic vehicle a collective understanding of its environment, and enable it to autonomously collect and upload weather data to an aggregation agent for corresponding locations.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
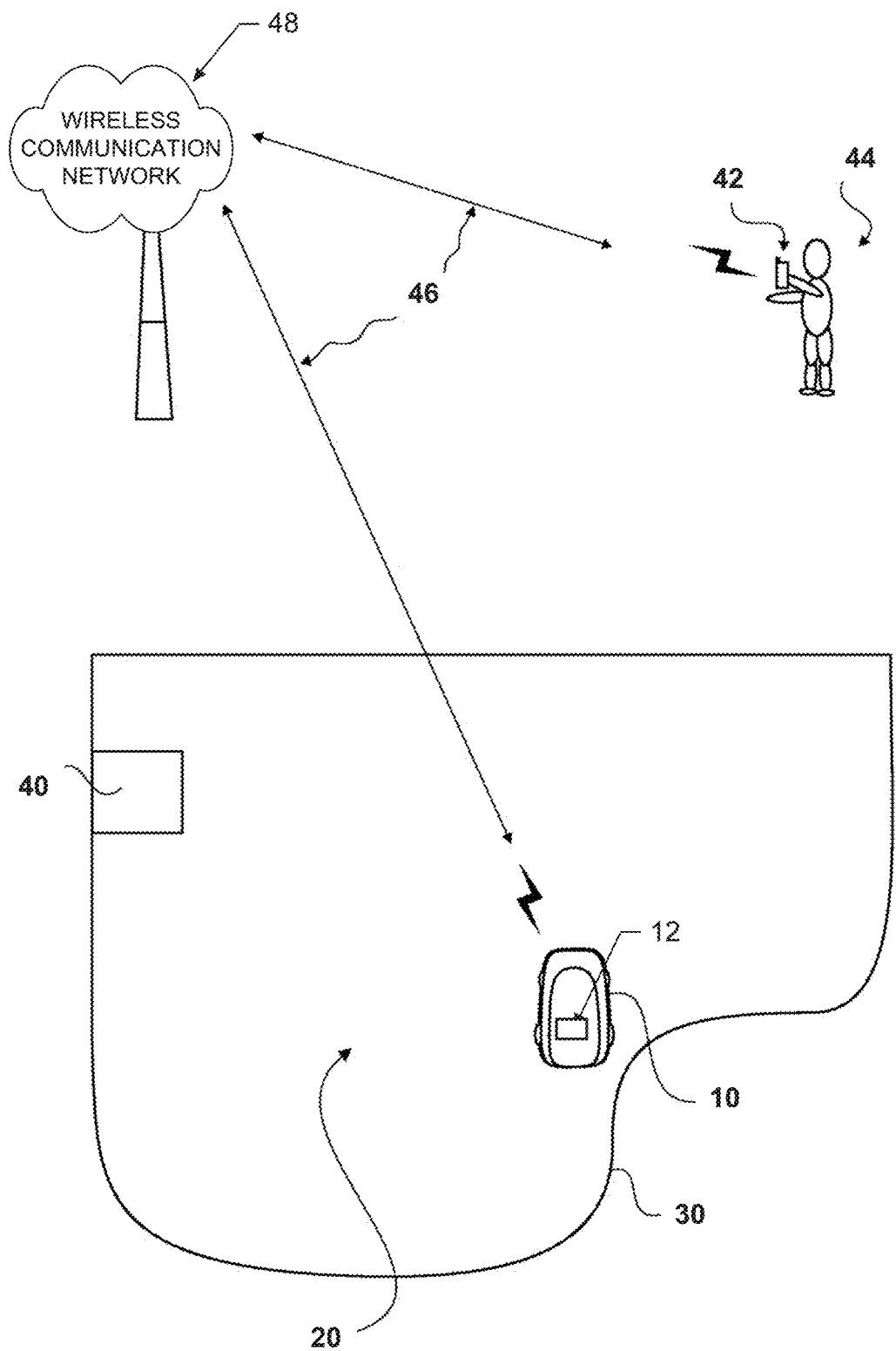
FIG. 1 illustrates an example operating environment for a robotic mower.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

In an example embodiment, a robotic vehicle (e.g., a robotic mower, a mobile sensing device, a watering device and/or the like) is provided with a positioning module and a sensor network. The positioning module may be configured to utilize one or more sensors to determine a location of the robotic vehicle and direct continued motion of the robotic vehicle. The sensor network may be configured to collect data (e.g., weather data). Other structures may also be provided, and other functions may also be performed as described in greater detail below.

FIG. 1 illustrates an example operating environment for a robotic mower 10 that may be employed in connection with an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is a boundary wire, the boundary wire may emit electrical signals that are detectable by the robotic mower 10 to inform the robotic mower 10 when the boundary 30 of the parcel 20 has been reached. Other robotic vehicles (e.g., a robotic watering vehicle) may operate in similarly defined areas, but an example embodiment will be described herein in connection with a robotic mower. However, it should be appreciated that example embodiments are not limited to application only on robotic mowers. Instead, example embodiments may also be practiced in connection with other robotic vehicles that operate within bounded regions.

The robotic mower 10 may be controlled, at least in part, via control circuitry 12 located onboard. The control circuitry 12 may include, among other things, a vehicle positioning module and a sensor network, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor network may gather data regarding the surroundings of the robotic mower 10 while the parcel 20 is traversed.

If a sensor network is employed, the sensor network may include sensors related to positional determination (e.g., a global positioning system (GPS) receiver, an inertial measurement unit (IMU) an accelerometer and/or the like). Thus, for example, positional determinations may be made using GPS, inertial navigation and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. In some cases, the sensors may also or alternatively collect data regarding various measurable parameters (e.g., moisture, temperature, light, barometric pressure, wind speed and pressure, rainfall, visibility, ultraviolet index, dew point, humidity, etc.) associated with particular locations on the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20. In cases where the robotic vehicle is not a mower, the control circuitry 12 may be configured to control another functional or working assembly that may replace the blade control system and blades.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic mower 10 via the electronic device 42, which may act as a remote control device for the robotic mower 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic mower 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

Figure 2:
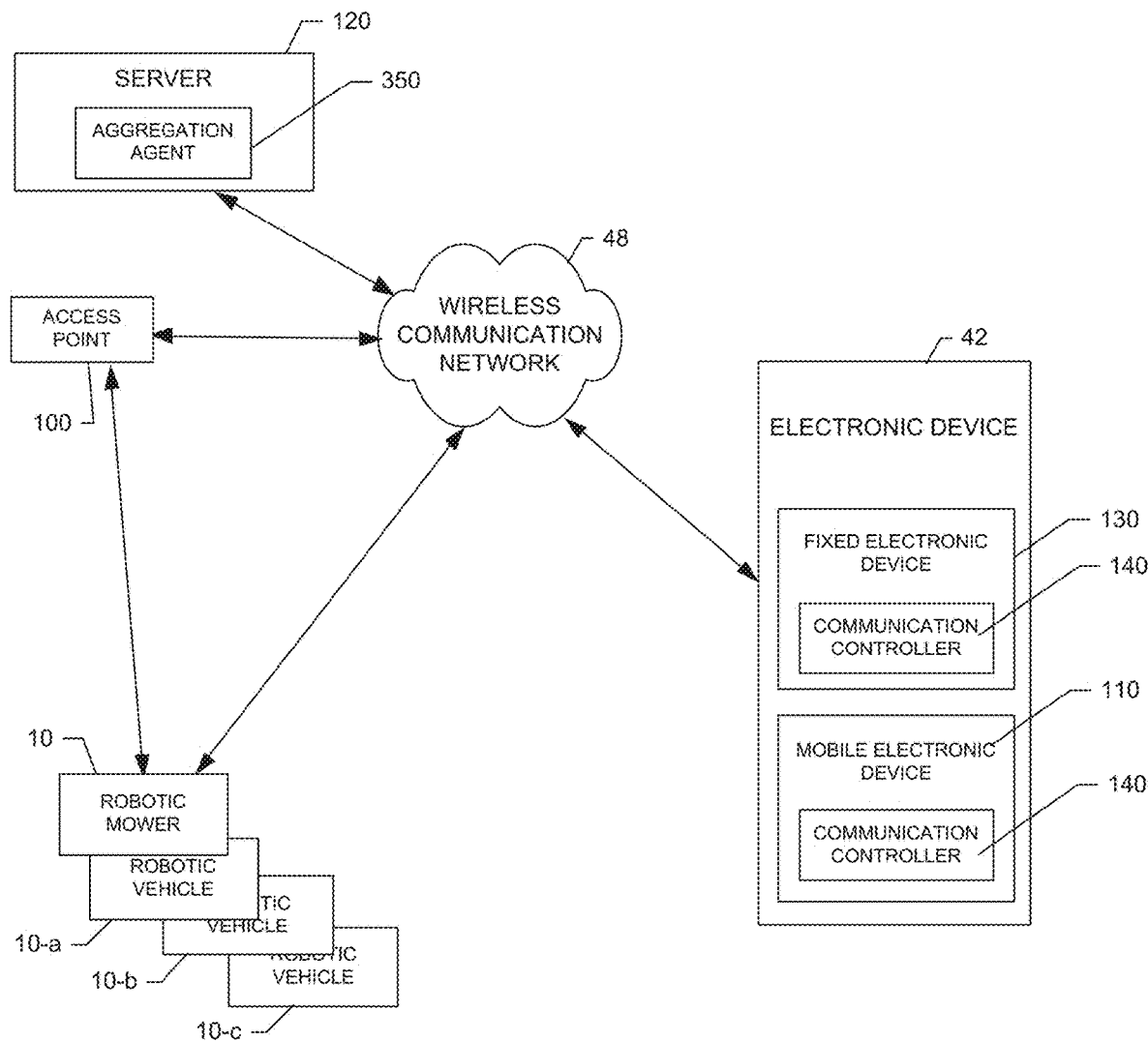
FIG. 2 illustrates a block diagram of a communication network of the robotic mower according to an example embodiment.

FIG. 2 illustrates a block diagram of various components that may be employed to facilitate aggregation of weather data in accordance with an example embodiment. As can be seen from FIG. 2, the wireless communication network 48 (e.g., the internet) may be capable of providing communication between the electronic device 42 and the robotic mower 10. When communication is established between the wireless communication network 48 and the robotic mower 10, the communication may be established using any suitable wireless communication mechanism such as, for example, second-generation (2G) wireless communication protocols IS-136 (TDMA), GSM, and IS-95 (CDMA), third-generation (3G) wireless communication protocols, such as UMTS, CDMA2000, WCDMA and TD-SCDMA, LTE or E-UTRAN, fourth-generation (4G) wireless communication protocols or the like. However, in some cases, a wireless access point 100 may be provided in association with the parcel 20 to serve the robotic mower 10. The wireless access point 100 may have a wired or wireless connection to the wireless communication network 48, and may then employ a short range communication protocol (e.g., WiFi, Bluetooth, or the like) to communicate with the robotic mower 10.

Regardless of the particular communication mechanism employed, it should be appreciated that user interaction between the electronic device 42 and the robotic mower 10 is facilitated by example embodiments. In some cases, information regarding the robotic mower 10, the parcel 20, the remote operator 44, account details associated with any of the foregoing, and/or the like, may be stored "in the cloud." For example, a server 120 may be provided as part of, or in communication with, the wireless communication network 48. The server 120 may include memory and/or processing components to store data and execute functionality associated with the employment of example embodiments. Thus, for example, instructions for operation of the robotic mower 10, data (e.g., weather data, position data and/or the like) to be collected, registered users or devices, and/or other information may be stored at the server 120.

In some cases, the manufacturer may provide an identifier, vehicle identification number, or other such identifying information regarding each robotic vehicle produced to the server 120 (or an instance thereof). The identification information may uniquely identify each instance of robotic vehicle and enable each respective robotic vehicle to be registered to a user, organization, parcel and/or user account. The server 120 may therefore store account information and correlate various account settings, programs, instructions, applications and/or the like, with the account generally or in association with all or particular ones of the robotic vehicles registered to the account. In some examples, actions of the server 120 may be controlled, managed, or coordinated by a controlling device (e.g., aggregation agent 350). The server 120 may interact with the electronic device 42 and/or the robotic mower 10 (or other robotic vehicles) individually in sequence or simultaneously in order to update, modify, execute or otherwise perform functions associated with the accounts and vehicles associated with the accounts.

In some embodiments, in addition or as an alternative to the mobile electronic device 110, the electronic device 42 could be embodied as a fixed electronic device 130 (e.g., a PC, computer terminal and/or the like). Thus, the remote operator 44 could be enabled to control the robotic mower 10 via the fixed electronic device 130 or via the mobile electronic device 110 (e.g., a smart phone, tablet, laptop, etc.). In some cases, the user may be enabled to log into an account associated with the user (or with the parcel 20, an organization responsible for the parcel 20, and/or the like) to manage tasks or data associated with the robotic mower 10 or with other robotic vehicles (e.g., robotic vehicle 10-a, robotic vehicle 10-b, and robotic vehicle 10-c) that may be associated with the account. In any case, a communication controller 140 may be embodied at the device from which instructions or other data/information associated with controlling the operation of the robotic mower 10 (or other robotic vehicles) associated with the account. The communication controller 140 may be used for interface on any electronic device 42 from which users access the Internet. Accordingly, for example, an instance of the communication controller 140 may be embodied at any (or each) device that is capable of remotely interacting with the robotic mower 10 (or other robotic vehicles).

Figure 3:
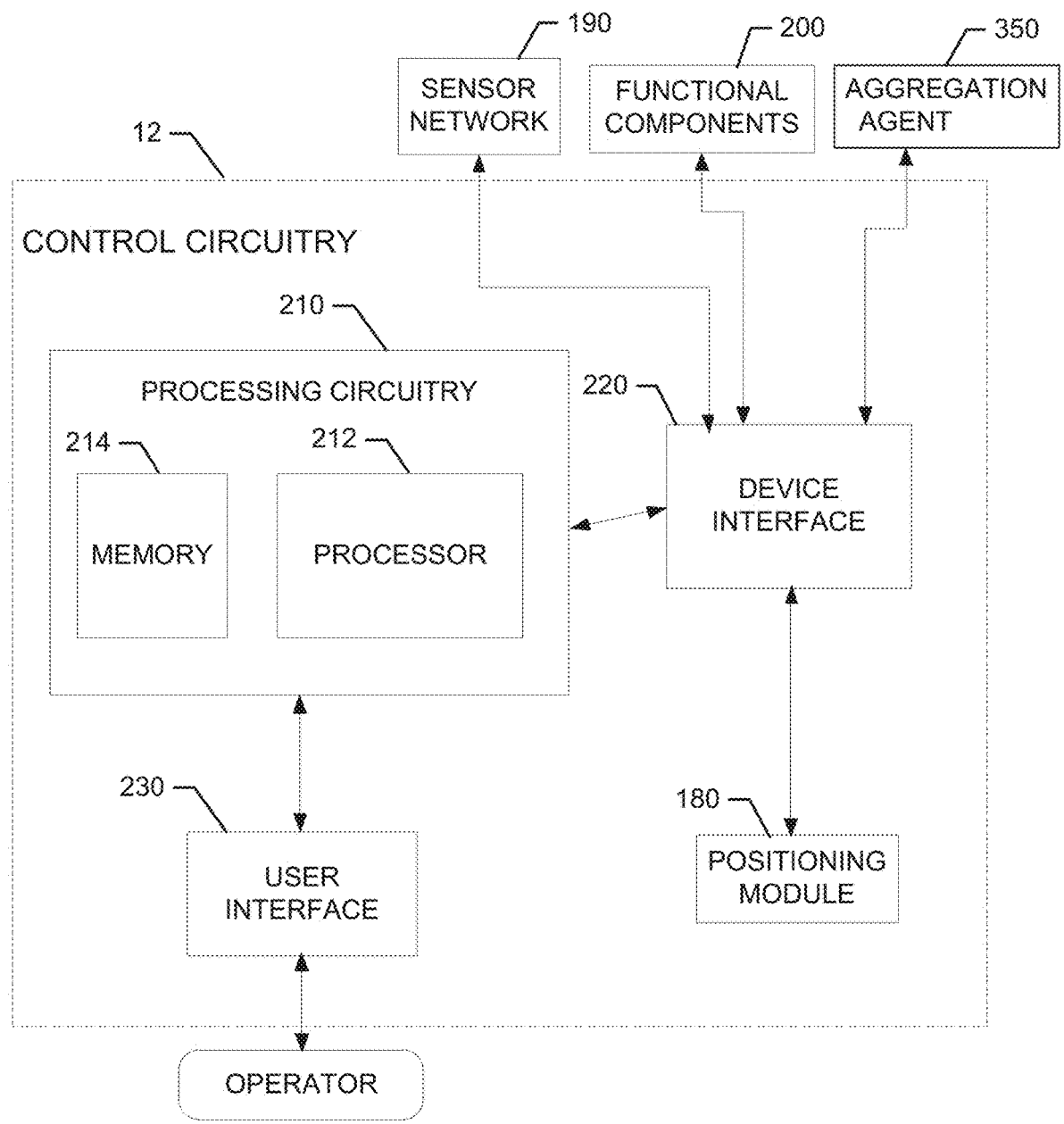
FIG. 3 illustrates a block diagram of various components of control circuitry to illustrate some of the components that enable or enhance the functional performance of the robotic mower and to facilitate description of an example embodiment.

Some examples of the interactions that may be enabled by example embodiments will be described herein by way of explanation and not of limitation. FIG. 3 illustrates a block diagram of various components of the control circuitry 12 to illustrate some of the components that enable the functional performance of the robotic mower 10 and to facilitate description of an example embodiment. In some example embodiments, the control circuitry 12 may include or otherwise be in communication with a positioning module 180 and/or a sensor network 190 disposed at the robotic mower 10. As such, for example, the functions attributable to the positioning module 180 and/or the sensor network 190 may be carried out by, under the control of, or in cooperation with the control circuitry 12. In some embodiments, the positioning module 180 may be part of a sensor network 190 of the robotic mower 10. However, in some cases, the positioning module 180 may be in communication with the sensor network 190 to facilitate operation of each respective module.

The robotic mower 10 may also include one or more functional components 200 that may be controlled by the control circuitry 12 or otherwise be operated in connection with the operation of the robotic mower 10. The functional components 200 may include a wheel assembly (or other mobility assembly components), one or more cutting blades and corresponding blade control components, and/or other such devices. In embodiments where the robotic vehicle is not a mower, the functional components 200 may include equipment for taking soil samples, operating valves, distributing water, seed, powder, pellets or chemicals, and/or other functional devices and/or components.

The control circuitry 12 may include processing circuitry 210 that may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230. As such, the processing circuitry 210 may be embodied as a circuit chip (e.g., an integrated circuit chip) configured (e.g., with hardware, software or a combination of hardware and software) to perform operations described herein. However, in some embodiments, the processing circuitry 210 may be embodied as a portion of an on-board computer. In some embodiments, the processing circuitry 210 may communicate with electronic components and/or sensors of the robotic mower 10 via a single data bus. As such, the data bus may connect to a plurality or all of the switching components and/or other electrically controlled components of the robotic mower 10.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the vehicle positioning module 180, the sensor network 190, and/or other functional components 200 of or associated with the robotic mower 10. As such, in some embodiments, the processor 212 (or the processing circuitry 210) may be said to cause each of the operations described in connection with the positioning module 180, the sensor network 190, and/or other functional components 200 by directing the positioning module 180, the sensor network 190, and/or other functional components 200, respectively, to undertake the corresponding functionalities responsive to execution of instructions or algorithms configuring the processor 212 (or processing circuitry 210) accordingly. These instructions or algorithms may configure the processing circuitry 210, and thereby also the robotic mower 10, into a tool for performing corresponding functions in the physical world in accordance with the instructions provided.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the positioning module 180, the sensor network 190, and/or other functional components 200 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from various sensors or components of the robotic mower 10. Among the contents of the memory 214, applications may be stored for execution by the processor 212 in order to carry out the functionality associated with each respective application.

In some cases, information associated with the positioning module 180 and/or the sensor network 190 may be extracted from the robotic mower 10 and mated with a remote network terminal or computer. The information stored on the memory 214 may then be extracted and thereby reported for fleet management or other applications. In other cases, the device interface 220 may be configured to wirelessly transmit information associated with the positioning module 180 and/or the sensor network 190 to a remote computer to enable data processing to be accomplished on the remote computer. For example, in some cases, Bluetooth, WiFi or other wireless communication modules may be provided by the device interface 220 in order to allow wireless downloading of software, support information or other data, or allow wireless uploading of data to network devices for support, management or other purposes. In some embodiments, Bluetooth, WiFi or other short range wireless communication modules may be used to communicate data to an intermediate device (e.g., a cell phone), which may then communicate the data to a computer or other device at which certain analysis and/or display may be performed. In still other cases, a removable memory device may be used to transfer information from the memory 214 to the removable memory device and thereafter to the remote computer. Thus, in some embodiments, weather data and/or position data may be communicated to an external computer and may be manipulated thereat, or may be correlated to other weather and/or position information (e.g., weather information from the National Weather Service).

The user interface 230 (if implemented) may be in communication with the processing circuitry 210 to receive an indication of a user input at the user interface 230 and/or to provide an audible, visual, mechanical or other output to the user. As such, the user interface 230 may include, for example, a display, one or more buttons or keys (e.g., function buttons), and/or other input/output mechanisms (e.g., microphone, speakers, cursor, joystick, lights and/or the like).

The device interface 220 may include one or more interface mechanisms for enabling communication with other devices either locally or remotely (e.g., the communication controller 140). In some cases, the device interface 220 may be any means such as a device or circuitry embodied in either hardware, or a combination of hardware and software that is configured to receive and/or transmit data from/to sensors or other components in communication with the processing circuitry 210. In some example embodiments, the device interface 220 may provide interfaces for communication of data from the communication controller 140, the positioning module 180, the sensor network 190, and/or other functional components 200 via wired or wireless communication interfaces in a real-time manner, as a data package downloaded after data gathering or in one or more burst transmission of any kind.

The positioning module 180 may be any means such as a device or circuitry embodied in either hardware, or a combination of hardware and software that is configured to perform the corresponding functions described herein. Thus, the module may include hardware and/or instructions for execution on hardware (e.g., embedded processing circuitry) that is part of the control circuitry 12 of the robotic mower 10. The module may share some parts of the hardware and/or instructions that form each module, or they may be distinctly formed. As such, the module and components thereof are not necessarily intended to be mutually exclusive relative to each other from a compositional perspective.

The positioning module 180 may be configured to utilize one or more sensors (e.g., of the sensor network 190) to determine a location of the robotic mower 10 and direct continued motion of the robotic mower 10 to achieve appropriate coverage of the parcel 20. As such, the robotic mower 10 (or more specifically, the control circuitry 12) may use the location information to determine a mower track and provide full coverage of the parcel 20 to ensure the entire parcel is mowed. The positioning module 180 may therefore be configured to direct movement of the robotic mower 10, including the speed of the robotic mower 10.

Various sensors of sensor network 190 of the robotic mower 10 may be included as a portion of, or otherwise communicate with, the positioning module 180 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 180.

Figure 4:
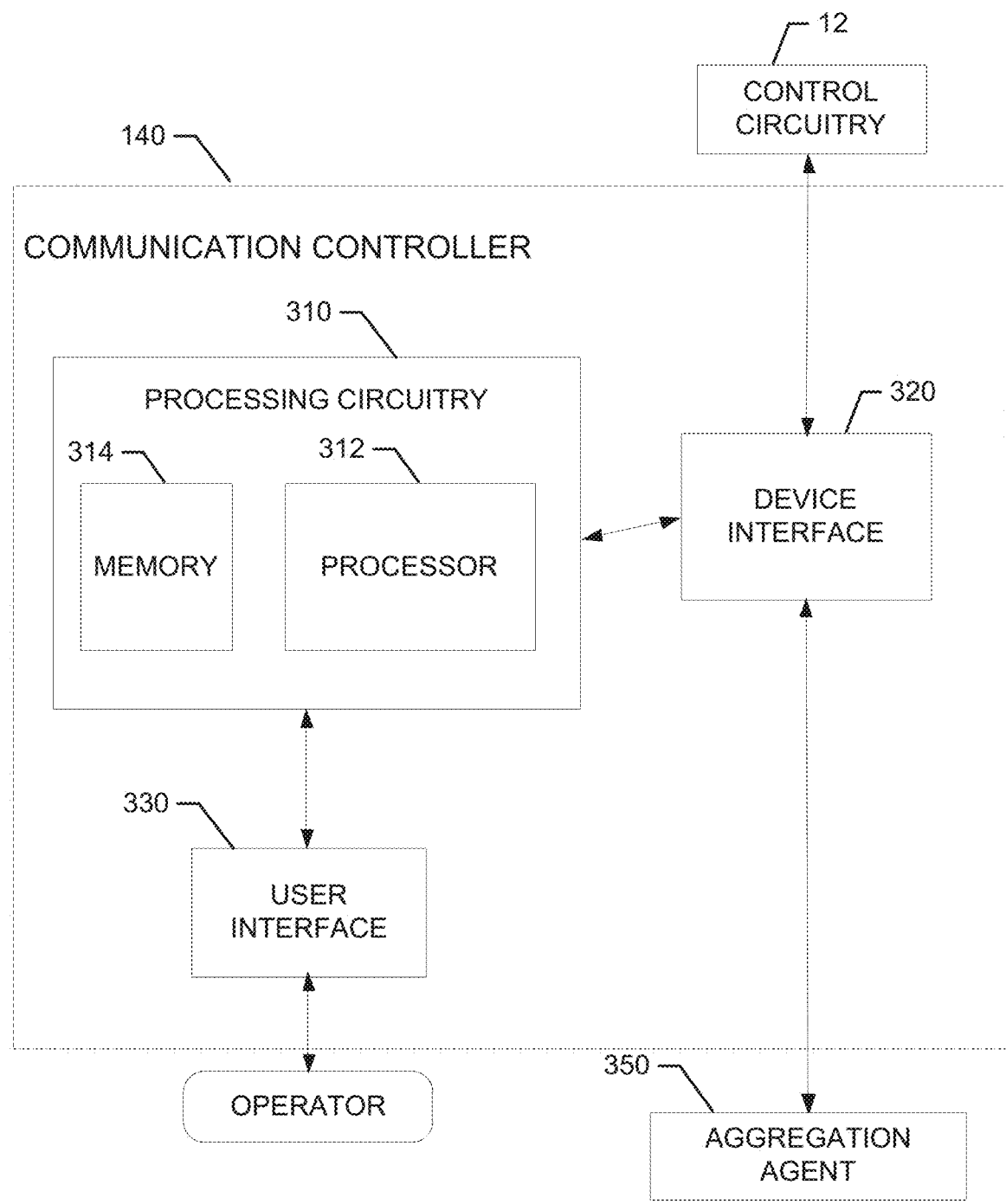
FIG. 4 illustrates a block diagram of various components of processing circuitry of an electronic device that can control the robotic mower remotely to illustrate some of the components that enable or enhance the functional performance of the electronic device and to facilitate description of an example embodiment.

In an example embodiment, as mentioned above, the communication controller 140 may interface with the control circuitry 12 of the robotic mower 10. The remote interaction may also be used for data gathering, data aggregation, task performance and/or the like. FIG. 4 illustrates a block diagram of the communication controller 140 of an example embodiment.

As shown in FIG. 4, the communication controller 140 may include processing circuitry 310 that may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of a programmable computer.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be configured to generate control consoles, user interface icons, control menus, option selections, input boxes, display-based interaction mechanisms, and/or the like by which the user may be enabled to provide instructions or other inputs for interaction with the server 120 and/or the robotic mower 10. As such, in some embodiments, the processor 312 (or the processing circuitry 310) may be said to cause each of the operations described in connection with the communication controller 140 by directing the communication controller 140 to undertake the corresponding functionalities responsive to execution of instructions or algorithms configuring the processor 312 (or processing circuitry 310) accordingly. These instructions or algorithms may configure the processing circuitry 310, and thereby also transform the communication controller 140, into a tool for performing corresponding functions in the physical world in accordance with the instructions provided such as, for example, providing interface mechanisms for controlling the operation of the robotic mower 10 relative to mowing, gathering data, reporting data gathered or other activity, and/or the like, for controlling the pairing of the robotic mower 10 with the electronic device, and/or for updating or modifying programs or applications that relate to settings or other activities of the accounts and devices associated with accounts that the user of the electronic device 42 is authorized to access.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the communication controller 140 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. Among the contents of the memory 314, applications may be stored for execution by the processor 312 in order to carry out the functionality associated with each respective application. In some cases, the applications may include an application for providing the interface consoles, screens, prompts and/or the like to enable the user to interface with the robotic mower 10 or interface with an account associated with the robotic mower 10, the parcel 20 or an organization associated with the robotic mower 10, the user, or the parcel 20.

The user interface 330 may be in communication with the processing circuitry 310 to receive an indication of a user input at the user interface 330 and/or to provide an audible, visual, mechanical or other output to the user. As such, the user interface 330 may include, for example, a display, one or more buttons or keys (e.g., function buttons, keyboard, etc.), and/or other input/output mechanisms (e.g., microphone, speakers, cursor, joystick, lights and/or the like).

The device interface 320 may include one or more interface mechanisms for enabling communication with other devices either locally or remotely (e.g., the remote mower 10 or the other remote vehicles). In some cases, the device interface 320 may be any means such as a device or circuitry embodied in either hardware, or a combination of hardware and software that is configured to receive and/or transmit information or data from/to devices or other components in communication with the processing circuitry 310. In some example embodiments, the device interface 320 may provide interfaces for communication of data to and/or from the remote mower 10 or the other remote vehicles via wired or wireless communication interfaces in a real-time manner. Interfaces for directing remote control of such vehicles may be provided as a data package downloaded from the server 120 in one or more burst transmissions of any kind.

Figure 5:
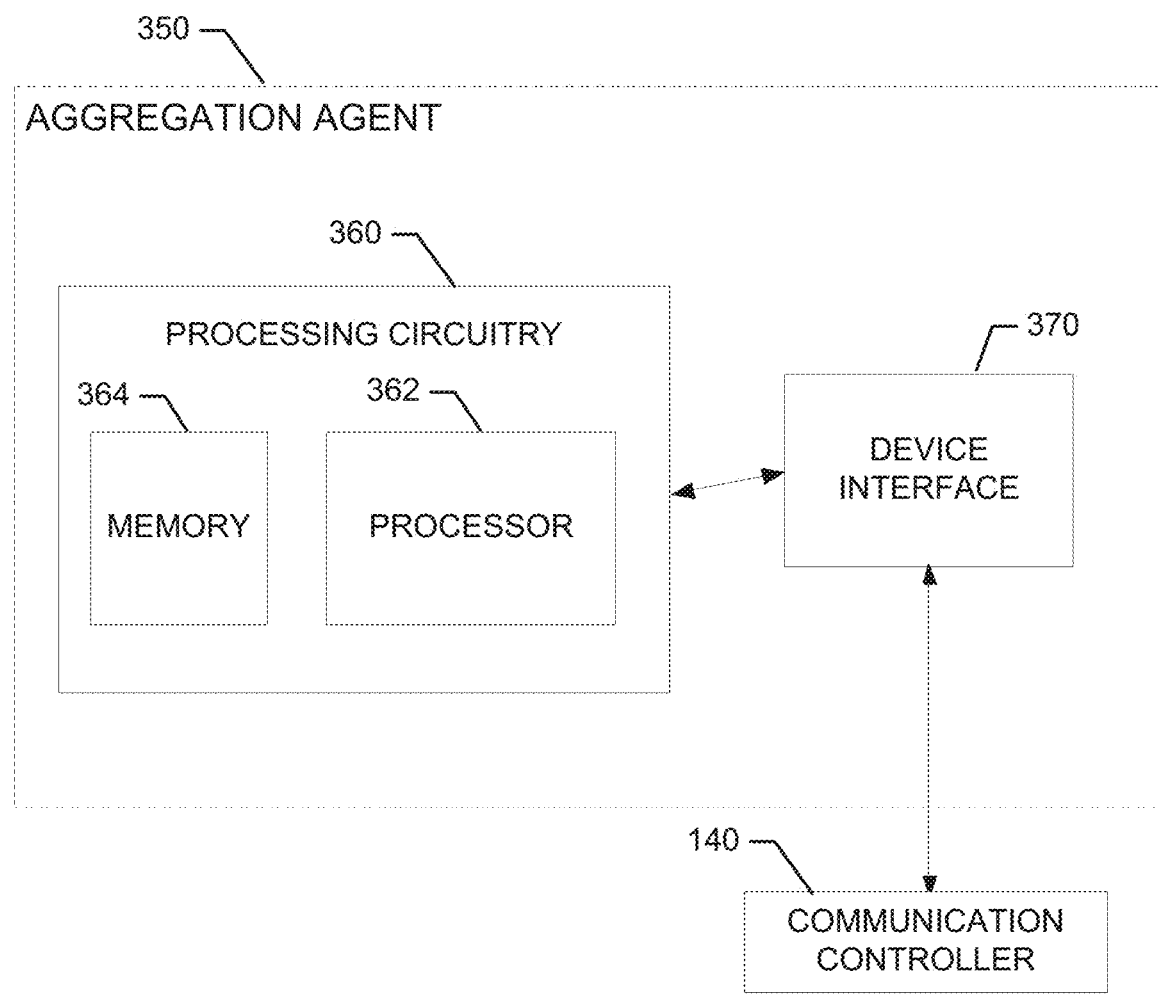
FIG. 5 illustrates a block diagram of various components of processing circuitry of an aggregation agent to illustrate some of the components that enable or enhance the functional performance of the aggregation agent and to facilitate description of an example embodiment.

In some embodiments, the server 120 may include the aggregation agent 350, which may be embodied as or otherwise include processing circuitry 360. The processing circuitry 360 may include a processor 362 and memory 364 as shown in FIG. 5. The processing circuitry 360 may also include a device interface 370. The processor 362, memory 364 and device interface 370 may be similar in function (and in some cases also form) to the processor 312, memory 314 and device interface 320 described above. Thus, specific descriptions of these components will not be repeated.

The aggregation agent 350 may be embodied as any device or means embodied in either hardware, software, or a combination of hardware and software configured to provide the interfaces and executable instructions for aggregating data associated with the robotic mower 10 (or other robotic vehicles) or the parcel 20. Thus, for example, the aggregation agent 350 may, in some cases, include an application having stored instructions that when executed by hardware (i.e., the processing circuitry 360), cause the processing circuitry 360 to be transformed into a tool for uploading data (e.g, weather data, position data, etc.). As such, the aggregation agent 350 may control storage and management of data (e.g, weather data, position data, etc.), error notification, connectivity, analytics, fleet management, and remote control functions. Aggregated data may be maintained at the server 120. Additionally, a listing of all distributed assets (i.e., robotic vehicles) may also be stored at the server 120. More information about some of these services is provided herein.

In an example embodiment, the processor 362 (or the processing circuitry 360) may be said to cause each of the operations described in connection with the aggregation agent 350 by directing the aggregation agent 350 to undertake the corresponding functionalities responsive to execution of instructions or algorithms configuring the processor 362 (or processing circuitry 360) accordingly. These instructions or algorithms may configure the processing circuitry 360, and thereby also transform the aggregation agent 350, into a tool for performing corresponding functions in the physical world in accordance with the instructions provided such as, for example, directing the operation of the robotic mower 10 relative to mowing, gathering data, reporting data gathered or other activity, and/or the like, receiving instructions from a user at the electronic device 42, and/or the like.

In an exemplary embodiment, the memory 364 may be configured to store information, data, applications, instructions or the like for enabling the aggregation agent 350 to carry out various functions in accordance with exemplary embodiments of the present invention. For example, the memory 364 could be configured to buffer input data for processing by the processor 362. Additionally or alternatively, the memory 364 could be configured to store instructions for execution by the processor 362. As yet another alternative, the memory 364 may include one or more databases that may store a variety of data sets responsive to input from various sensors or components of the robotic mower 10. Among the contents of the memory 364, applications may be stored for execution by the processor 362 in order to carry out the functionality associated with each respective application. In some cases, the applications may include an application for storing and manipulating collected data; facilitating setting up of communication links between paired devices; storing information such as routes, programs, task lists and/or the like. Additionally or alternatively, for example, the applications may include one or more algorithms for directing operation of the robotic mower 10 for capturing data, mowing, performing other actions, and/or the like. In some cases, one or more applications may be provided for data aggregation, notifications, adjusting settings, fleet management and/or the like as described herein.

As can be appreciated from the descriptions above, in some cases, the programmatic control may include programming the robotic mower 10 to respond to certain situations detected at the robotic mower 10. Thus, certain conditions detected (e.g., via the sensor network 190) may trigger corresponding responses and the conditions and/or responses may be programmed using the aggregation agent 350. In some cases, the sensor network 190 may detect when the robotic mower 10 is removed from the parcel 20. In such cases, a local alarm at the robotic mower 10 may be triggered. Additionally or alternatively, a notification may be sent from the robotic mower 10 to the server 120 and/or the electronic device 42 to alert the user of the removal from the parcel 20 (e.g., via email, MMS or other alerting mechanisms). In other cases, the robotic mower 10 may be programmed to avoid operation during certain detectable weather conditions (or when such conditions are reported via internet connection), or avoid operation when other yard maintenance equipment is operating (e.g., when an irrigation system is operating).

In some embodiments, position and status updates may routinely, continuously, or periodically be provided to the server 120 and/or the electronic device 42. If provided to the server 120, the user may be enabled to monitor such status information when logged in at the electronic device 42. However, the aggregation agent 350 may enable the user to define specific events or triggers that will cause the server 120 to notify the user upon any such occurrences being reported to the server 120. Error or fault conditions may also result in notifications being provided from the robotic mower 10 to the server 120 and/or the electronic device 42. Other conditions, such as service related conditions, may be monitored at the server 120 and the user may be notified when corresponding service conditions warrant attention. Data for troubleshooting or other analytics may also be provided from the robotic mower 10 to the server 120 and/or the electronic device 42. Thus, the aggregation agent 350 may further provide a mechanism by which to troubleshoot various device performance issues.

Figure 6:
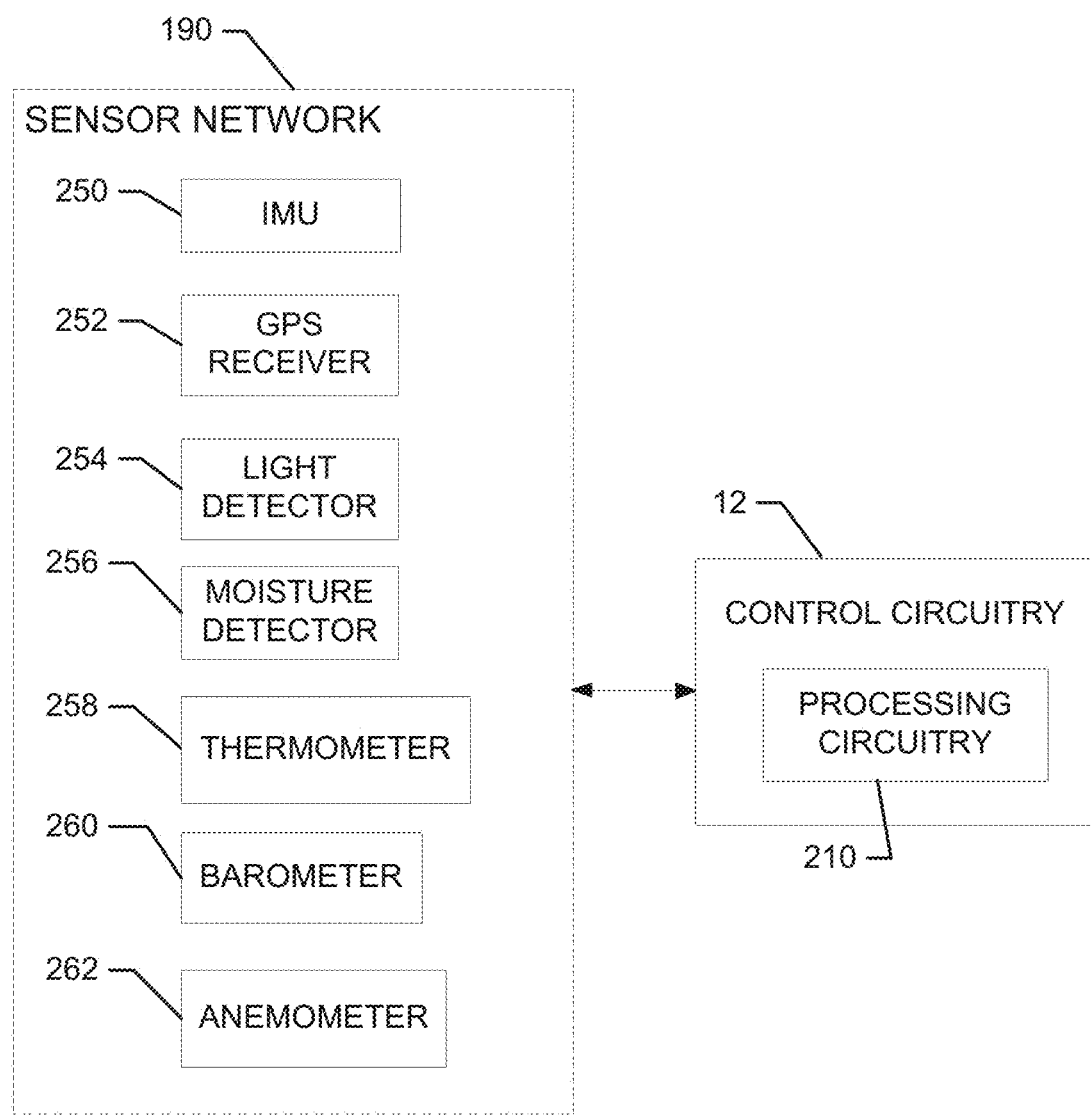
FIG. 6 illustrates a block diagram of some components that may be employed as part of a sensor network in accordance with an example embodiment.

In an example embodiment, the sensor network 190 may provide data to the modules described above to facilitate execution of the functions described above, and/or any other functions that the modules may be configurable to perform. In some cases, the sensor network 190 may include (perhaps among other things) any or all of inertial measurement unit (IMU) 250, a GPS receiver 252, a light detector 254, a moisture detector 256, a thermometer 258, a barometer 260, and an anemometer 262, as shown in FIG. 6. In this regard, FIG. 6 illustrates a block diagram of some components that may be employed as part of the sensor network 190 in accordance with an example embodiment.

The sensor network 190 may include independent devices with on-board processing that communicate with the processing circuitry 210 of the control circuitry 12 via a single data bus, or via individual communication ports. However, in some cases, one or more of the devices of the sensor network 190 may rely on the processing power of the processing circuitry 110 of the control circuitry 12 for the performance of their respective functions. As such, in some cases, one or more of the sensors of the sensor network 190 (or portions thereof) may be embodied as portions of the positioning module 180.

The IMU 250 may include one or more and any or all of combinations of accelerometers, odometers, gyroscopes, magnetometers, compasses, and/or the like. As such, the IMU 250 may be configured to determine velocity, direction, orientation and/or the like so that dead reckoning and/or other inertial navigation determinations can be made by the control circuitry 12. The IMU 250 may be enabled to determine changes in pitch, roll and yaw to further facilitate determining terrain features and/or the like.

Inertial navigation systems may suffer from integration drift over time. Accordingly, inertial navigation systems may require a periodic position correction, which may be accomplished by getting a position fix from another more accurate method or by fixing a position of the robotic mower 10 relative to a known location. For example, navigation conducted via the IMU 250 may be used for robotic mower 10 operation for a period of time, and then a correction may be inserted when a GPS fix is obtained on robotic mower position. As an example alternative, the IMU 250 determined position may be updated every time the robotic mower 10 returns to the charge station 40 (which may be assumed to be at a fixed location). In still other examples, known reference points may be disposed at one or more locations on the parcel 20 and the robotic mower 10 may get a fix relative to any of such known reference points when the opportunity presents itself. The IMU 250 determined position may then be updated with the more accurate fix information.

In some embodiments, the GPS receiver 252 may be embodied as a real time kinematic (RTK)-GPS receiver. As such, the GPS receiver 252 may employ satellite based positioning in conjunction with GPS, GLONASS, Galileo, GNSS, and/or the like to enhance accuracy of the GPS receiver 252. In some cases, carrier-phase enhancement may be employed such that, for example, in addition to the information content of signals received, the phase of the carrier wave may be examined to provide real-time corrections that can enhance accuracy.

The light detector 254 may be configured to detect light using any of a variety of different detection methods related to the particular features that the light detector 254 is configured to perceive. The light detector 254 may include one or more and any or all of combinations of pyranometers, UV index detectors, visibility detectors, and/or the like. In this regard, the light detector 254 may be configured to detect light based on solar radiation flux density, incident sunlight angle and ozone concentration, scattered particles in the air, and/or the like.

As mentioned above, the sensor network 90 may also include a moisture detector 156. The moisture detector 256 may be configured to detect light using any of a variety of different detection methods related to the particular features that the moisture detector 256 is configured to perceive. The moisture detector 256 may include one or more and any or all of combinations of metal-paper coil type hygrometers, hair tension hygrometers, psychrometers, sling psychrometers, chilled mirror dew point hygrometers, dew point transmitters, rain gauges, and/or the like. As such, the moisture detector 256 may be configured to determine moisture content in the atmosphere using temperature, pressure, mass, mechanical or electrical change in a substance as moisture is absorbed, and/or the like. Alternatively or in addition, the moisture detector 256 may be configured to measure the amount of rainfall that has occurred over a given period of time.

In some embodiments, the thermometer 258 may be configured to detect temperature or a temperature gradient using a temperature sensor in which some physical change occurs with temperature, plus some means of converting this physical change into a numerical value. In certain embodiments, the physical change in the temperature sensor may occur as a result of thermal expansion of a solid or a liquid with changing temperature or change in pressure of a gas upon heating or cooling. Alternatively or in addition, in further embodiments, the thermometer 258 may comprise a radiation-type thermometer, which may measure the infrared energy emitted by an object without contact with that object.

The barometer 260 may be configured to detect light using any of a variety of different detection methods related to the particular features that the barometer 260 is configured to perceive. The barometer 260 may include water-based barometers, mercury barometers, vacuum pump oil barometers, aneroid barometers, barographs, microelectromechanical systems (MEMS) barometers, Collins patent table barometers, Hooke's otheometers, Ross sympiesometers, shark oil barometers, pressure altimeters, and/or the like. As such, the barometer 260 may be configured to determine atmospheric pressure. In such embodiments, the barometer may predict stormy weather by indicating decreasing atmospheric pressure.

The anemometer 262 may be configured to detect light using any of a variety of different detection methods related to the particular features that the anemometer 262 is configured to perceive. In some embodiments, the anemometer 262 may include velocity anemometers and/or pressure anemometers. In certain embodiments, velocity anemometers may include cup anemometers, vane anemometers, hot-wire anemometers, laser Doppler anemometers, sonic anemometers, acoustic resonance anemometers, ping-pong ball anemometers, and/or the like. Alternatively or in addition, pressure anemometers may include plate anemometers, tube anemometers, pitot tube static anemometers, and/or the like. As such, the anemometer 262 may be configured to measure wind speed and wind pressure.

In an example embodiment, the positioning module 180 may be configured to incorporate input from a plurality of sources (e.g., among sensor network 190 components that can generate an estimated position or cooperate to generate an estimated position) to generate a composite position based on the position information received from each of the various sources available. Thus, for example, each sensor (or at least multiple sensors) may provide separate information that can be used by the positioning module 180 to determine a corresponding position estimate. Each position estimate may also have a weight associated therewith based on time, accuracy estimates or other factors. The positioning module 180 may then calculate the composite position based on a weighted average of the individual position estimates from each respective source that has an input to provide. In some cases, predicted positions may further be determined based on current inputs, system model information and previous state information.

In some example embodiments, rather than (or in addition to) estimating a composite position, the positioning module 180 may be configured to rank or order position estimates based on a confidence score associated with each position input provided from the various sources available. The position estimate with the highest confidence score may then be selected as the current estimated position. Additionally or alternatively, the positioning module 180 may be configured to use one or more of the available sensors as a primary sensor for determining position. The positioning module 180 may also be configured to "reset" or update the primary sensor as appropriate if a more accurate position source becomes available (e.g., as in the example of resetting the IMU 250 when a more accurate position source is available).

Embodiments of the present invention may therefore be practiced using an apparatus such as the one depicted in FIGS. 3-6, in connection with the system of FIG. 2. However, it should also be appreciated that some embodiments may be practiced in connection with a computer program product for performing embodiments or aspects of the present invention. As such, for example, each block or step of the flowcharts of FIGS. 7-9, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 214, 314 and/or 364) and executed by processing circuitry (e.g., processor 212, 312 and/or 362).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 7-9. Moreover, other methods derived from the descriptions provided herein may also be performed responsive to execution of steps associated with such methods by a computer programmed to be transformed into a machine specifically configured to perform such methods.

Figure 7:
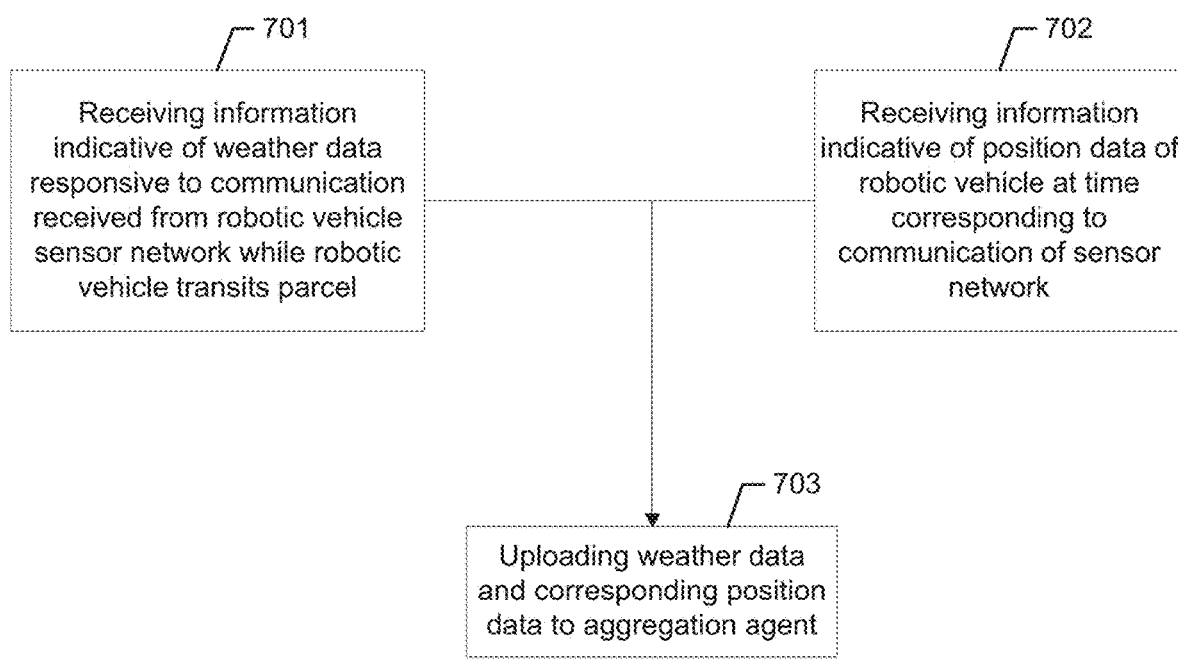
FIG. 7 illustrates a block diagram of a method for collecting and uploading weather data according to an example embodiment.

In an example embodiment, a method for collecting and uploading weather data according to FIG. 7 may include receiving information indicative of weather data responsive to communication received from a sensor network 190 of a robotic mower 10 while the robotic mower 10 transits a parcel 20 in operation 700, receiving information indicative of position data of the robotic mower 10 at a time corresponding to communication from the sensor network 190 in operation 710, and uploading the weather data and the corresponding position data to the aggregation agent 350 in operation 720.

Figure 8:
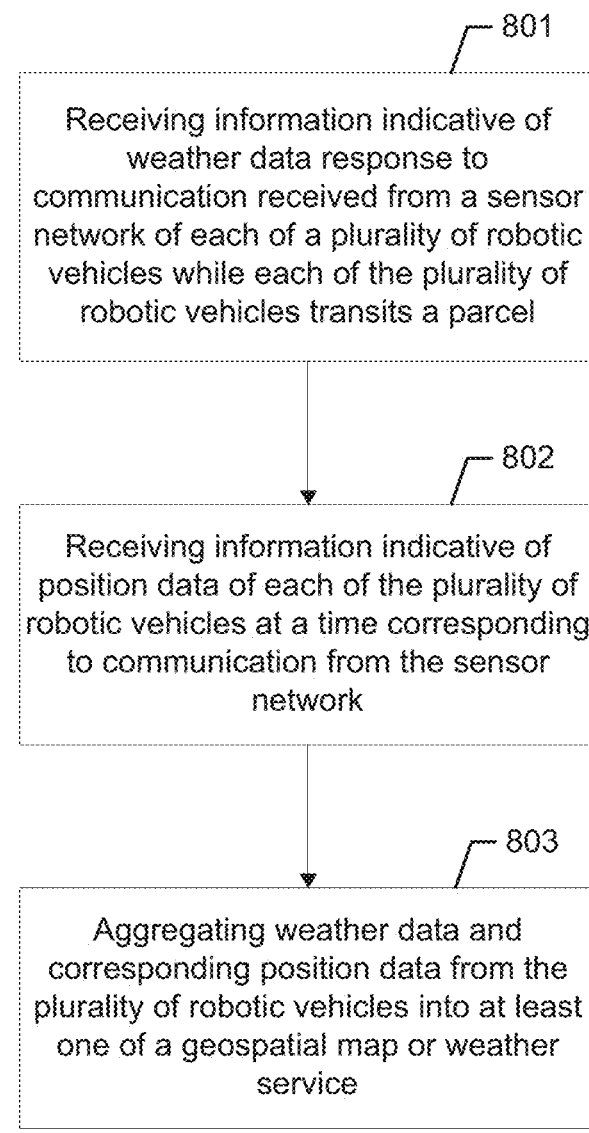
FIG. 8 illustrates a block diagram of a method for collecting and aggregating weather data according to an example embodiment.

In an example embodiment, a method for collecting and aggregating weather data according to FIG. 8 may include receiving information indicative of weather data responsive to communication received from a sensor network 190 of each of a plurality of robotic mowers 10-*a*, 10-*b*, 10-*c* while each of the plurality of robotic mowers 10-*a*, 10-*b*, 10-*c* transits a parcel 20 at operation 800, receiving information indicative of position data of each of the plurality of robotic mowers 10-*a*, 10-*b*, 10-*c* at a time corresponding to communication from the sensor network 190 at operation 810, and aggregating weather data and corresponding position data from the plurality of robotic mowers 10-*a*, 10-*b*, 10-*c* into at least one of a geospatial map or weather service at operation 820.

Figure 9:
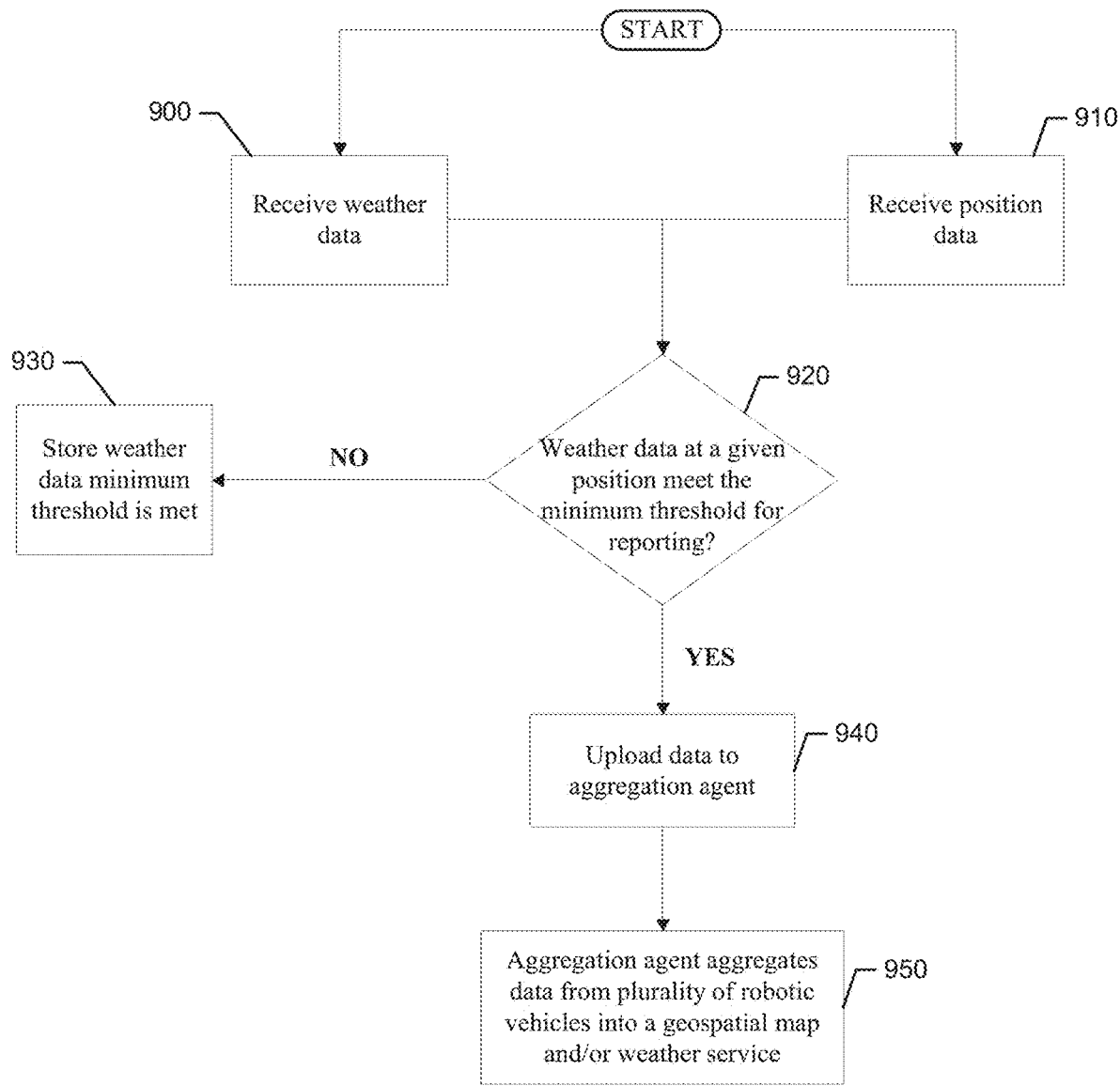
FIG. 9 illustrates a control flow diagram of one example of how the robotic mower can be operated in relation to using the sensors thereon to collect and aggregate weather data according to an example embodiment.

FIG. 9 illustrates a control flow diagram of one example of how the robotic mower 10 can be operated in relation to using the sensors thereon to collect and aggregate weather data in accordance with an example embodiment. As shown in FIG. 9, operation may begin with receiving weather data at operation 900 and receiving position data at operation 910. The operation may continue at operation 920 by making a decision as to whether the weather data at a given position meets a minimum threshold for reporting the data to the aggregation agent 350. In this regard, if the decision is made to not report the weather data to the aggregation agent 350, then the robotic mower 10 will store the weather and position data until the minimum threshold is met at operation 930. However, if the decision is made to report the weather and position data to the aggregation agent 350, then the robotic mower 10 will upload the weather and position data to the aggregation agent 350 at operation 940. Then, at operation 950, the aggregation agent 350 will aggregate weather and position data from a plurality of robotic mowers 10-*a*, 10-*b*, 10-*c* into a geospatial map and/or weather service.

As discussed in relation to operations 920 and 930, the minimum threshold may correspond to a series of parametric requirements determined by the robotic mower 10. In certain embodiments, the parametric requirements may include but are not limited to specific amounts of change in temperature, moisture levels, light, barometric pressure, wind speed, wind pressure, rainfall, visibility, ultraviolet index, dew point, and humidity, as detected by the sensor network 190. Such parametric requirements may be factory-set or operator-selectable.

In determining whether to report the collected weather data to the aggregation agent 350, the robotic mower 10 must classify the weather data as in operation 920. To classify the weather data, the robotic mower 10 may determine whether the collected weather data exceeds the factory-set or operator-selected parametric requirements. In addition, when the collected weather data does exceed the factory-set or operator-selected parametric requirements, the robotic mower 10 may determine whether a combination of these exceeded parametric requirements is indicative of some meteorological significance (e.g., possibility of an incoming tornado, thunderstorm, front, etc.). If the robotic mower 10 does classify the combination of exceeded parametric requirements as indicative of meteorological significance, then the robotic mower 10 may upload the collected weather data to the aggregation agent 350.

As such, in some cases, the robotic mower 10 may generally operate in accordance with a control method that combines the modules described above to provide a functionally robust robotic vehicle. In this regard, a method according to example embodiments of the invention may include any or all of the operations shown in FIG. 9. Moreover, other methods derived from the descriptions provided herein may also be performed responsive to execution of steps associated with such methods by a computer programmed to be transformed into a machine specifically configured to perform such methods.

In an example embodiment, an apparatus for performing the methods of FIGS. 7-9 above may comprise processing circuitry (e.g., processing circuitry 360) that may include a processor (e.g., an instance of the processor 362 at the server 120) configured to perform some or each of the operations (700-720, 800-820, 900-940) described above. The processing circuitry 360 may, for example, be configured to perform the operations (700-720, 800-820, 900-940) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (700-720, 800-820, 900-940) may comprise, for example, the processing circuitry 360.

Figure 10:
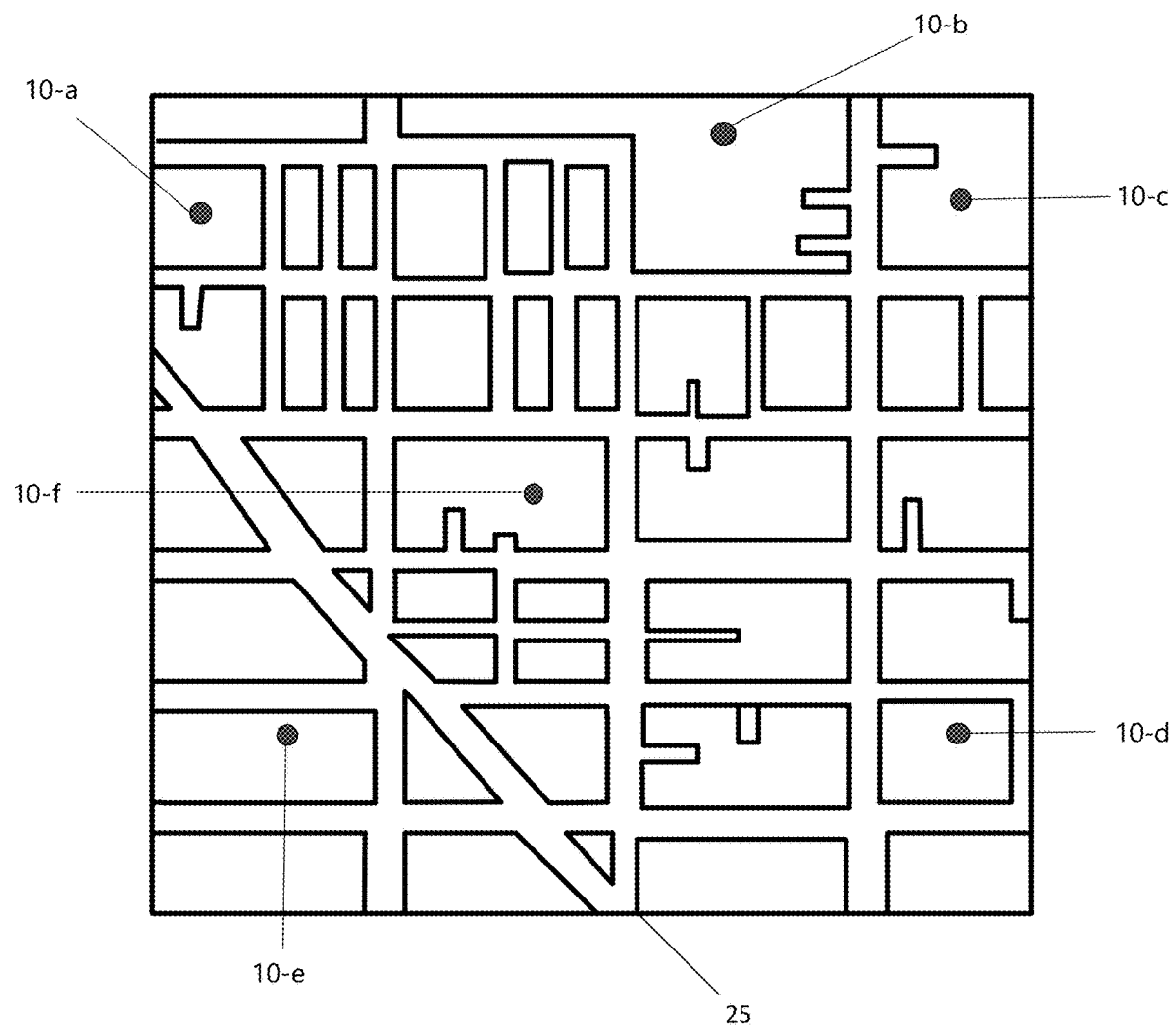
FIG. 10 illustrates an example operating environment for a plurality of robotic mowers according to an example embodiment.

FIG. 10 illustrates an example operating environment for a plurality of robotic mowers according to an example embodiment. As shown in FIG. 10, a plurality of robotic mowers **10-*a*, 10-*b*, 10-*c*, 10-*d*, 10-*e*, 10-*f* are distributed at various positions throughout a geographical area 25. The plurality of robotic mowers 10-*a*, 10-*b*, 10-*c*, 10-*d*, 10-*e*, 10-*f* collect position data using their respective position modules 180 and weather data using their respective sensor networks 190 at each position throughout the geographical area 25. If this data meets minimum threshold requirements, each of the plurality of robotic mowers 10-*a*, 10-*b*, 10-*c*, 10-*d*, 10-*e*, 10-*f* upload this weather and position data to the aggregation agent 350**, which aggregates the data into geospatial maps and/or weather services.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
    receiving weather data responsive to a communication received from a sensor network of a robotic mower or watering vehicle while the robotic mower or watering vehicle transits a parcel of land;
    receiving position data specifying a current position of the robotic mower or watering vehicle at a time corresponding to the communication from the sensor network;
    determining, based on the weather data received while the robotic mower or the watering vehicle is at the current position, whether a minimum threshold for reporting the weather data and the position data to the aggregation agent has been met, the minimum threshold corresponding to one or more weather-related parametric requirements comprising at least an occurrence of a threshold change in a sensed dew point as indicated by the weather data received at the current position; and
    uploading the weather data and the position data to the aggregation agent in response to the minimum threshold being met.

2. The method of claim 1, wherein the minimum threshold is factory-set or operator-selectable.

3. The method of claim 1, wherein the robotic mower or watering vehicle comprises:
    a positioning module configured to direct movement of the robotic mower or watering vehicle; and
    a sensor network.

4. The method of claim 1, wherein the sensor network further comprises at least one of an inertial measurement unit (IMU), a global positioning system (GPS) receiver, a real time kinematic (RTK)-GPS receiver, a light detector, a moisture detector, a thermometer, a barometer, an anemometer, or combinations thereof.

5. The method of claim 1, further comprising in response to the minimum threshold not being met, storing the weather data and the position data at the robotic mower or watering vehicle until the minimum threshold is met.

6. The method of claim 1, wherein the minimum threshold further comprises an amount of change in rainfall.

7. The method of claim 1, wherein the minimum threshold further comprises an amount of change in humidity.

8. The method of claim 1, wherein the plurality of weather-related parametric requirements further comprise specific amounts of change in temperature, light, barometric pressure, wind speed, wind pressure, rainfall, visibility, and ultraviolent index.

9. The method of claim 1, wherein the minimum threshold corresponding to the plurality of weather-related parametric requirements further comprises the weather data being indicative of an occurrence of a meteorological event.

10. The method of claim 1, wherein the meteorological event comprises a tornado, a thunderstorm, or a front.

11. A method comprising:
    receiving weather data responsive to a communication received from a sensor network of each of a plurality of robotic mowers or watering vehicles while each of the plurality of robotic mowers or watering vehicles transits a parcel of land;
    receiving position data specifying a current position of each of the plurality of robotic mowers or watering vehicles at a time corresponding to the communication from each of the sensor networks;
    determining, based on the weather data received while the plurality of robotic mowers or the watering vehicles is at the current positions, whether a minimum threshold for reporting the weather data and the position data from the plurality of robotic mowers or watering vehicles to the aggregation agent has been met, the minimum threshold corresponding to one or more weather-related parametric requirements comprising at least an occurrence of a threshold change in a sensed dew point as indicated by the weather data received at the current position; and
    uploading the weather data and the position data to the aggregation agent in response to the minimum threshold being met.

12. The method of claim 11, wherein each of the plurality of robotic mowers or watering vehicles comprises:
    a positioning module configured to direct movement of each of the plurality of robotic mowers or watering vehicles.

13. The method of claim 11, wherein the sensor network further comprises at least one of an inertial measurement unit (IMU), a global positioning system (GPS) receiver, a real time kinematic (RTK)-GPS receiver, a light detector, a moisture detector, a thermometer, a barometer, an anemometer, or combinations thereof.

14. The method of claim 11, further comprising storing the weather data and the position data at the plurality of robotic mowers or watering vehicles until the minimum threshold is met.

15. The method of claim 11, further comprising aggregating the weather data and the position data from the plurality of robotic mowers or watering vehicles into at least one of a geospatial map or weather service in response to the weather data and the position data being uploaded to the aggregation agent.

16. A robotic vehicle comprising:
    a positioning module configured to direct movement of the robotic vehicle;
    a sensor network comprising a real time kinematic (RTK)-global positioning system (GPS) receiver configured to provide position data indicative of a current position of the robotic vehicle and a moisture detector configured to provide moisture content data; and processing circuitry configured to:
        receive weather data responsive to a communication received from the sensor network of the robotic vehicle while the robotic vehicle transits a parcel, the weather data comprising the moisture content data;
        receive position data specifying the current position of the robotic vehicle at a time corresponding to the communication from the sensor network;
        determine, based on the weather data received while the robotic vehicle is at the current position, whether a minimum threshold for reporting the weather data and the position data to an aggregation agent has been met, the minimum threshold corresponding to one or more weather-related parametric requirements comprising at least an occurrence of a threshold change in a sensed dew point as indicated by the weather data received at the current position; and
        upload the weather data and the position data to the aggregation agent in response to the minimum threshold being met.

17. The robotic vehicle of claim 16, wherein the sensor network further comprises at least one of a light detector, a thermometer, a barometer, an anemometer, or combinations thereof.

* * * * *